United States Patent [19]

Nakamura

[11] Patent Number: 4,564,137
[45] Date of Patent: Jan. 14, 1986

[54] METHOD OF MAKING A CLUTCH ROTOR FOR AN ELECTROMAGNETIC CLUTCH

[75] Inventor: Yasuo Nakamura, Isesaki, Japan
[73] Assignee: Sanden Corporation, Japan
[21] Appl. No.: 517,703
[22] Filed: Jul. 27, 1983

Related U.S. Application Data

[63] Continuation-in-part of Ser. No. 511,961, Jul. 8, 1983.

[30] Foreign Application Priority Data

Jul. 30, 1982 [JP] Japan .............................. 57-133260

[51] Int. Cl.⁴ .......................................... B23K 31/02
[52] U.S. Cl. ............................ 228/173.6; 29/159 R; 29/455 R
[58] Field of Search .................. 72/62, 68, 105, 348, 72/402, 368, 370; 29/159 R, 455 R; 228/112, 113, 114, 173 C

[56] References Cited

U.S. PATENT DOCUMENTS

| | | | |
|---|---|---|---|
| 2,685,856 | 8/1954 | Wickwire et al. | 113/52 |
| 2,929,345 | 3/1960 | Zatyko | 113/51 |
| 3,044,594 | 7/1962 | Bernard | 192/84 |
| 3,082,933 | 3/1963 | Bernard | 230/15 |
| 3,562,888 | 2/1971 | Settle | 29/159 |
| 3,654,790 | 4/1972 | Zatko | 72/82 |
| 3,953,995 | 5/1976 | Haswell et al. | 29/159 R |
| 3,977,264 | 8/1976 | Sproul | 29/159 R |
| 4,197,756 | 4/1980 | Yaros | 29/159 R |
| 4,313,323 | 2/1982 | Kanemitsu | 29/159 R |
| 4,314,472 | 2/1982 | Saegusa | 72/341 |
| 4,395,811 | 8/1983 | Frye | 72/348 |

FOREIGN PATENT DOCUMENTS

| | | | |
|---|---|---|---|
| 2488534 | 2/1982 | France | 72/105 |
| 483242 | 10/1954 | Italy | 72/62 |

Primary Examiner—Lowell A. Larson
Attorney, Agent, or Firm—Banner, Birch, McKie & Beckett

[57] ABSTRACT

A method of making a clutch rotor for use in an electromagnetic clutch according to this invention includes the steps of forming a cup-shaped blank with a generally cylindrical annular flange wall; applying an outward transaxial force to the annular flange wall of the cup-shaped blank to form an annular outward bulge in the flange wall forming at least one inwardly projecting approximately V-shaped groove in the annular bulge by a press operation; applying a roller working operation to the approximately V-shaped groove to form the final V-shaped groove; and welding an inner cylindrical member to the bottom plate at its radial inner end surface.

8 Claims, 16 Drawing Figures

METHOD OF MAKING A CLUTCH ROTOR FOR AN ELECTROMAGNETIC CLUTCH

This application is a continuation in part of application Ser. No. 511,961, filed on July 8, 1983.

BACKGROUND OF THE INVENTION

This invention relates to electromagnetic clutches and, more particularly, to a method of making a clutch rotor. Electromagnetic clutches of this type are adaptable for use in controlling the transmission of an automobile engine output to a refrigerant compressor of an automobile air conditioning apparatus.

The basic construction and operation of the electromagnetic clutches which are usable for controlling the power transmission between the automobile engine and the refrigerant compressor to selectively drive the compressor are well known. Examples of such basic construction and operation are found in prior patents, such as U.S. Pat. Nos. 3,044,594 and 3,082,933.

Referring to FIG. 1 herein, a prior art electromagnetic clutch will be described. FIG. 1 is a cross-sectional view of a known electromagnetic clutch which is mounted on a refrigerant compressor. The electromagnetic clutch is disposed on the outer peripheral portion of a tubular extension 2 projecting from an end surface of a compressor housing 1. Tubular extension 2 surrounds a drive shaft 3 of the compressor. Drive shaft 3 is rotatably supported in compressor housing 1 through bearings (not shown). The electromagnetic clutch includes a clutch rotor which is rotatably mounted on tubular extension 2 through a bearing 4, and is connected to an automobile engine (not shown) through a belt 6. Rotor 5 is thus subjected to strong tension forces. Rotor 5 is provided with a plurality of concentric arcuate magnetic pole faces 5a at its axial end. Outer terminal end of drive shaft 3 extends from tubular extension 2, and a hub 7 is fixed on the extending terminal end of drive shaft 3. An annular armature plate 8 is flexibly joined by a plurality of leaf springs 9 to hub 7 in such a fashion that armature plate 8 faces pole faces 5a of rotor 5 with a predetermined axial air gap between plate 8 and pole faces 5a. An electromagnet 10 is mounted on compressor housing 1 and is concentric with drive shaft 3. Electromagnet 10 is fixed within an annular hollow portion 5b formed in rotor 5 with a surrounding air gap to supply the magnetic flux for attracting armature plate 8 to the pole faces 5a of rotor 5.

Thus, when an electromagnetic coil 101 of electromagnet 10 is energized, armature plate 8 is attracted to concentric pole faces 5a of rotor 5. Drive shaft 3 is then rotated together with rotor 5 by the engine output through leaf springs 9 and hub 7. When electromagnetic coil 101 of electromagent 10 is not energized, armature plate 8 is separated from pole faces 5a of rotor 5 due to elasticity of leaf springs 9. Rotor 5 is thus rotated by the engine output, but the compressor is not driven.

In these prior electromagnetic clutches, rotor 5 consists of an outer cylindrical portion 51 formed with at least one V-shaped groove 51a for receiving belt 6, an inner cylindrical portion 52, and an axial end annular plate portion 53 which connects outer and inner cylindrical portions 51. The concentric pole face 5a are formed in the axial end surface of annular plate portion 53. This rotor 5, as shown in FIG. 1, has been formed as an integral body of magnetic material by forging followed by machining. But the resultant rotor 5 is heavy, so that the total weight of the compressor having the electromagnetic clutch is relatively large. This means that the load on the drive source, such as the automobile engine, is increased. Furthermore, since the forging process only forms a preformed or rough rotor, an amount of rotor material must be machined to form the final, accurately dimensioned rotor, with the result that relatively large quantities of waste metal are produced. Such forging and machining of the rotor also consumes a great deal of time.

In order to avoid these disadvantages and to obtain the light weight clutch rotor, another prior art rotor, rotor 5', shown in FIG. 2, has been made. In rotor 5' an annular magnetic body 51' and an annular V-shaped groove member 52' are separately produced by a press forming method. In this construction, main annular body 51' and V-shaped groove member 52' are brazed to one another after main annular body 51' is fitted into V-shaped groove member 52'. In this method, welding material is unequally deposited between main annular body 51' and groove member 52', resulting in an unbalance of rotor 5'. Furthermore, main annular body 51' of rotor 5' is formed by cold forging, which requires the use of a large press machine. In this method, the main annular body 51' must be passed through a plurality of working processes, which include an annealing process to remove the strain on the main annular body 51' caused by such cold forging to form the final, accurately dimensioned rotor 5'. The forming process of the rotor is thus complicated.

In order to avoid the above disadvantages, another prior art rotor, rotor 5" shown in FIG. 3, has been made. In rotor 5" an L-shaped magnetic body 51" and an annular V-shaped groove member 52" are separately formed by a press forming method. In this construction, L-shaped magnetic body 51" consists of inner cylindrical member 51a" and an axial end annular plate portion 51b" and both member 51b" and 52" are brazed to one another. Since the mating surfaces between magnetic body 51" and V-shaped groove member 52" are brazed, the strength of the rotor at the mating surfaces is unstable. Rotor 5" is also unbalanaced because of the difficulty in obtaining a uniform brazed connection between the mating surfaces.

SUMMARY OF THE INVENTION

It is the primary object of this invention to provide an electromagnetic clutch of reduced weight and at low cost without harm to the magnetic property of the clutch.

It is another object of this invention to provide a light weight rotor of an electromagnetic clutch which is simple in construction and simply produced with less wasted material and time.

It is still another object of this invention to provide an electromagnetic clutch which is simple to assemble.

According to this invention, an electromagnetic clutch comprises a first magnetic rotatable member rotatably supported on a first bearing, the first rotatable member being provided with at least one annular groove in the outer portion thereof for receiving a belt operatively connecting it with an external driving power source to be rotated by the external driving power source and having axial end magnetic friction surfaces, a second rotatable member rotatably supported on a second bearing, an annular magnetic member being supported on the second rotatable member so as to be capable of limited axial movement and having an axial end surface which faces the magnetic friction surfaces of the first rotatable member with an axial gap therebetween, and electromagnetic means associated with one of the first rotatable member and the annular magnetic member for attracting the other member, wherein the first rotatable member comprises an outer cylindrical member and axial end plate member which are formed integrally with one another, and an inner cylindrical member which is welded at the radial inner end surface of the axial end plate member and wherein the annual groove in the first rotatable member is formed on the outer cylindrical member by pressing and rolling operations.

A method of making a clutch rotor for use in an electromagnetic clutch according to this invention includes the steps of forming a cup-shaped blank with a generally cylindrical annular flange wall; applying an outward transaxial force to the annular flange wall of the cup-shaped blank to form an annular outward bulge in the flange wall forming at least one inwardly directed approximately V-shaped groove in the annular bulge by a press operation; applying a roller working operation to the approximately V-shaped groove to form the final V-shaped groove; and welding an inner cylindrical member to the bottom plate at its radial inner end surface.

Further objects, features and other aspects of this invention will be understood from the following detailed description of a preferred embodiment of this invention referring to be annexed drawings.

DETAILED DESCRIPTION OF A PREFERRED EMBODIMENT

Figure 1:
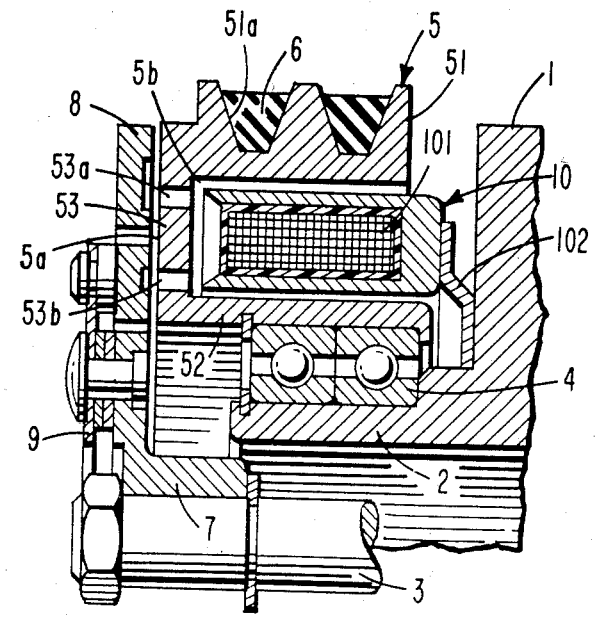
FIG. 1 is a cross-sectional view of a prior art electromagnetic clutch.
Figure 2:
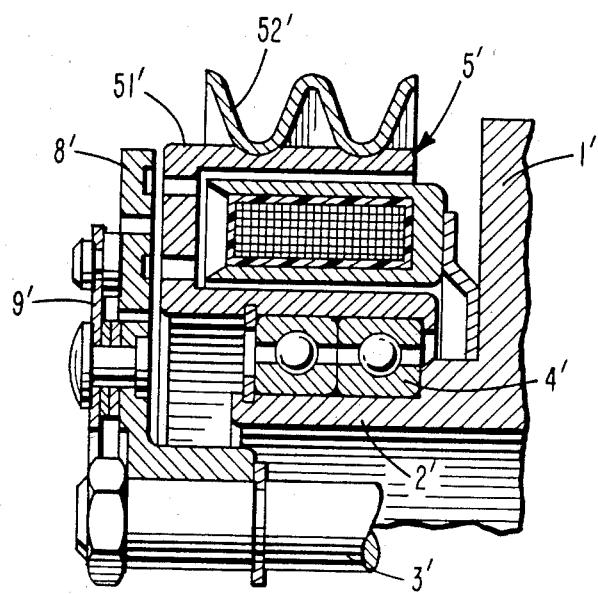
FIG. 2 is a cross-sectional view of another prior art electromagnetic clutch.
Figure 4:
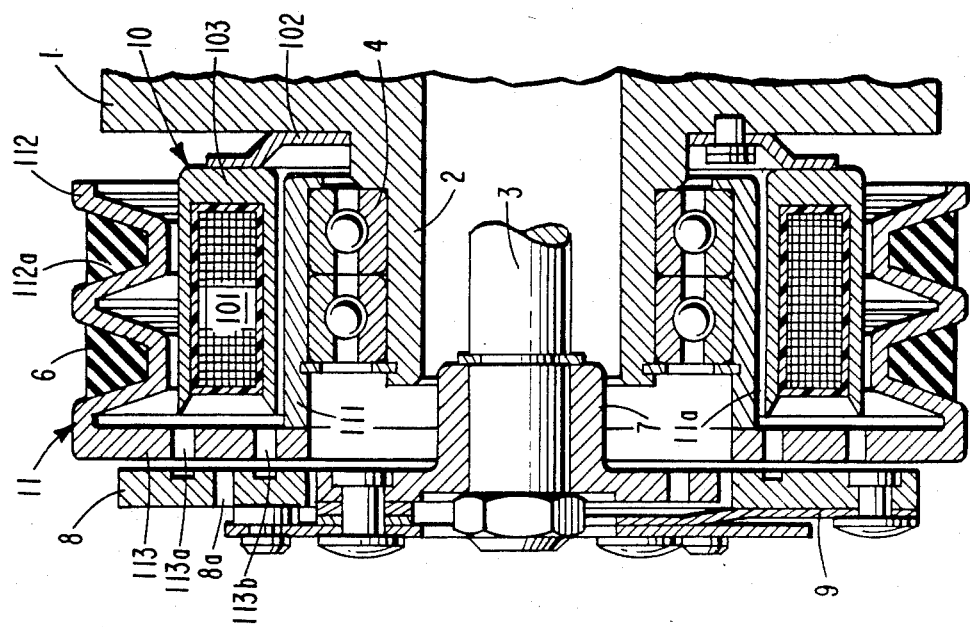
FIG. 4 is a cross-sectional view of an electromagnetic clutch in accordance with the present invention.
Figure 3:
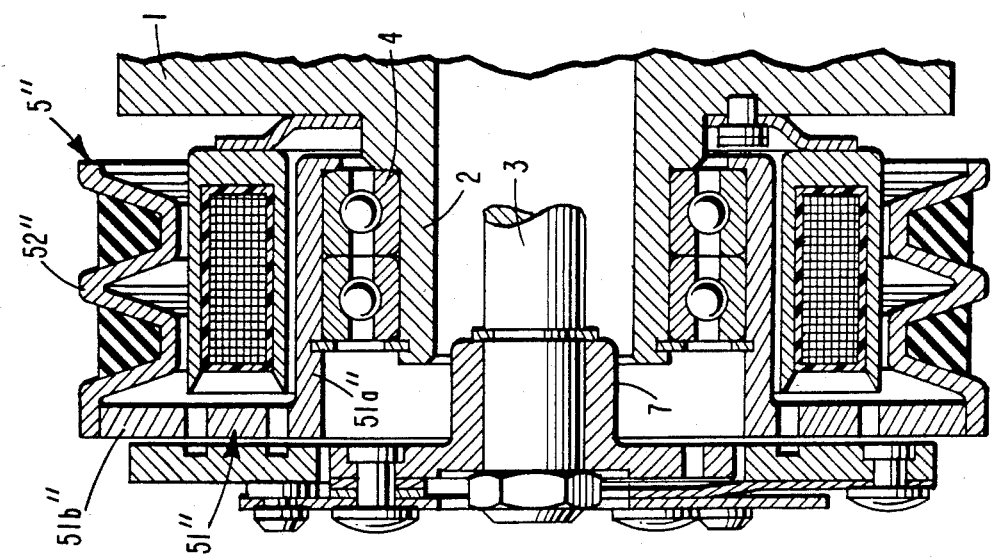
FIG. 3 is a cross-sectional view of still another prior art electromagnetic clutch.

Referring to FIG. 4, the shown embodiment is similar to the prior art electromagnetic clutches shown in FIGS. 1, 2 and 3, except for the construction of the clutch rotor. Therefore, the similar parts are represented by the same reference characters as in FIG. 1 and a detailed description of the similar parts will be omitted for the purpose of simplifying the following description.

In the embodiment shown in FIG. 4, clutch rotor 11, which is formed of magnetic material, such as steel, comprises an inner cylindrical portion 111, the inner wall surface of which is fitted on the outer peripheral surface of ball bearing 4, an outer annular portion 112 formed with at least one belt receiving groove 112a, and an axial end annular plate portion 113 connecting the outer and inner portions 111,112. In this embodiment, outer annular portion 112 and axial end plate portion 113 are formed integral with one another and inner cylindrical portion 111 in welded to axial end plate portion 113. An annular hollow portion 11a is thus defined by these three portions 111–113 to contain the electromagnet 10 in a stationary position. Electromagnet 10 is fixed on compressor housing 1 by a support plate 102. The axial end of annular plate portion 113 has concentric arcuate slots as shown by 113a, 113b to form concentric arcuate magnetic pole faces at its axial end. Armature plate 8 also has arcuate slots as shown by 8a.

Belt 6, which is operatively connected to an automobile engine, is received in groove 112a of rotor 11, so that rotor 11 is usually rotated by the engine output through belt 6.

In this arrangement, when electromagnet coil 101 is energized, magnetic flux flows through a closed loop comprising a magnetic housing 103 of electromagnet 10, outer annular portin 112 of rotor 11, armature plate 8, axial end plate portion 113 of rotor 11, and inner cylindrical portion 111 of rotor 11. Therefore, armature plate 8 is attracted to axial end plate portion 113, so that drive shaft 3 is rotated together with rotor 11 through hub 7. Drive shaft 3 is connected to an automotive air conditioning compressor (not shown), and is rotatably supported by a bearing.

Referring to FIGS. 5a–5f, the procedure for making a clutch rotor for an electromagnetic clutch according to this invention will be described.

Figure 5A:
FIGS. 5a–5f are diagrammatic sectional views illustrating the method of making a clutch rotor according to the present invention.
Figure 5B:
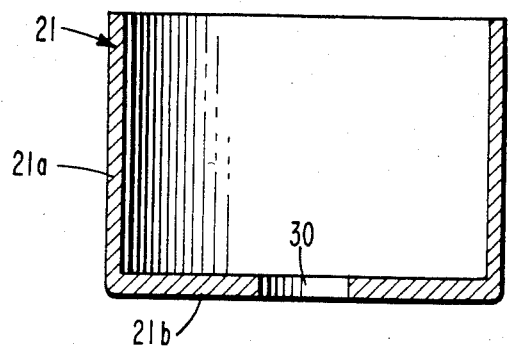

As a first step for making the clutch rotor, a circular or annular sheet metal blank 20 (FIG. 5a) of proper size is bent by usual pressing operations in a series of cup dies to form cup-shaped blank 21 (FIG. 5b). Cup-shaped blank 21 consists of a cylindrical wall portion 21a projecting from the outer peripheral surface of bottom end plate portion 21b. A circular hole 30 located at the center portion of bottom end plate portion 21b is formed by punching during the pressing operation. Bottom end plate portion 21b is thus formed as the axial end plate portion of the rotor.

Figure 5C:
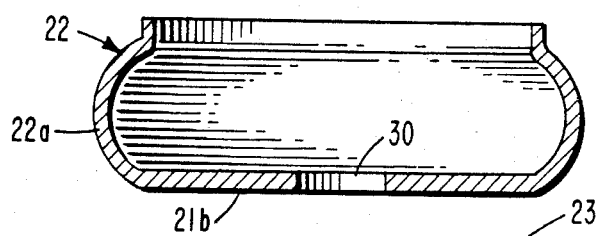

In the next step of making clutch rotor 11, an outward transaxial force is applied to the cylindrical wall portion 21a of cup-shaped blank 21 to form an annular bluge portion 22a of second stage blank 22 of FIG. 5c. The operation of forming bulge portion 22a is carried out by applying outward radial pressure against the cylindrical wall portion 21a of cup-shaped blank 21 at the point where bulge portion 22a is to be formed. The manner of carrying out this operation will be more fully described hereinafter.

Figure 5D:
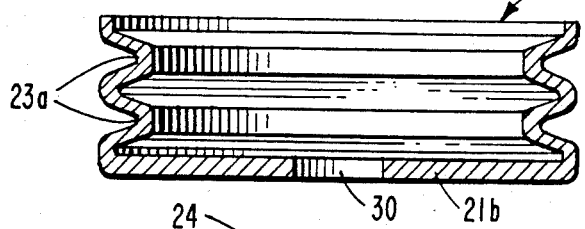

The second stage blank 22 with bulge portion 22a of FIG. 5c, in the next step of making clutch rotor 11 is bent along bulge portion 22a by a pressing operation to form a groove stage blank 23 of FIG. 5d. The groove stage blank 23 has at least one rough (approximately V-shaped) groove 23a formed at bulge portion 22a of second stage blank 22, although in the preferred form, as shown in FIG. 5d, there are two such grooves.

Figure 5E:
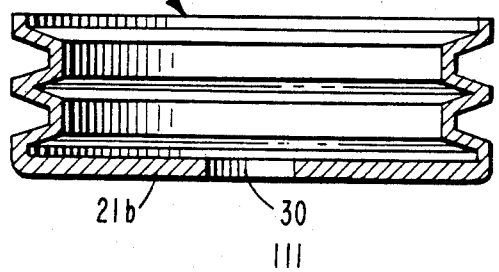

The next step in making clutch rotor is illustrated in FIG. 5e. The groove stage blank 23 with a plurality of rough grooves 23a is roller worked to form the final V-shaped grooves in which a belt can be received. This roller cold working operation for forming V-shaped grooves may be carried out in the roller spinning dies generally indicated at 60 in FIG. 8, described below.

Figure 5F:
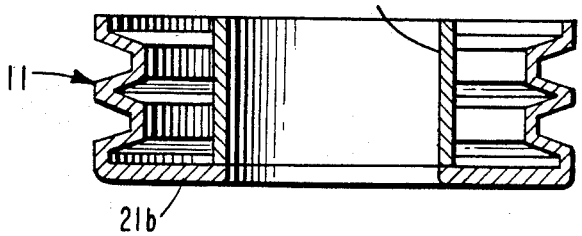

The final operation to make clutch rotor 11 is illustrated in FIG. 5f. In this step, an inner cylindrical portion 111 of rotor 11, such as pipe member 33, is welded to the inner end surface of bottome end plate 21b of cup-shaped stage blank 21, i.e., to axial end portion 113 of rotor 11, by frictional welding. By completing the above operations or steps, the final accurate dimentions of rotor 11 are obtained easily.

Figure 6A:
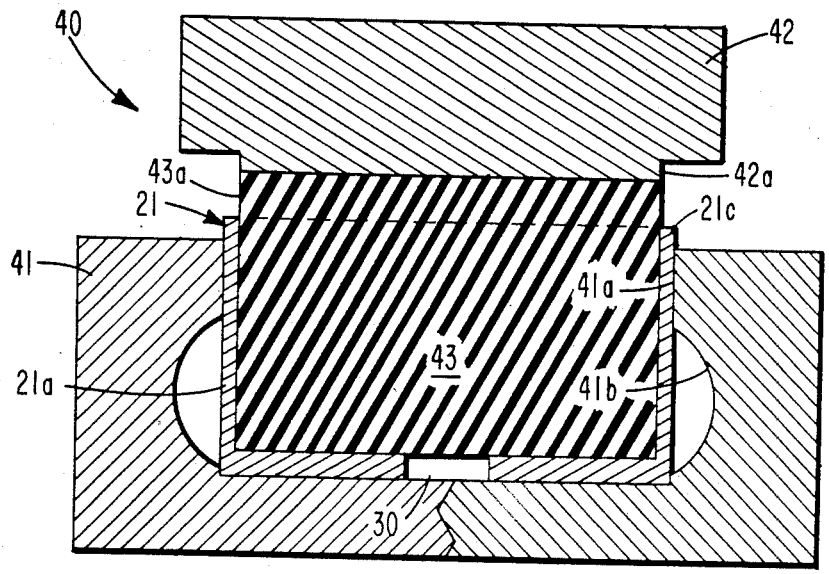
FIGS. 6a and 6b are diagrammatic sectional views through a stamping dies used to form an annular bulge of FIG. 5c.
Figure 6B:
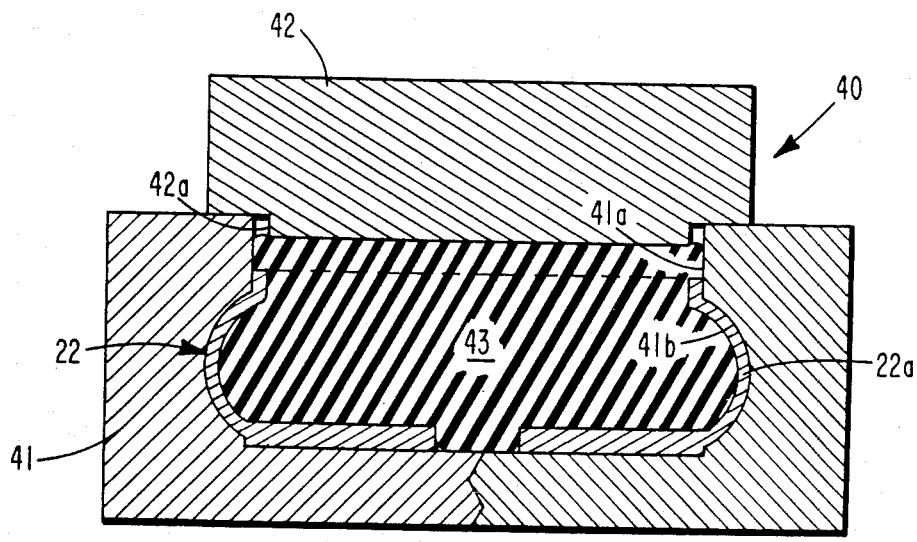

FIGS. 6a and 6b illustrate a typical stamping device which may be used to form annular bulge portion 22a of second stage blank 22 of FIG. 5c from cup-shaped stage blank of FIG. 5b. Referring to FIG. 6a, the stamping device 40 to form the second stage blank 22 with annular bulge portion 22a includes a bottom die 41 formed with a cylindrical opening 41a for receiving cup-shaped blank 21, an upper die 42, and a rubber block 43 disposed within the cup-shaped blank 21. The inner surface of cylindrical opening 41a is formed with an annular arc shaped recess 41b which serves as a mold for annular bulge portion 22a. The upper die 42 has an annular projection 42a which faces the bottom die 41. The diameters of projection 42a and rubber block 43 are each substantially the same as the internal diameter of cup-shaped blank 21. However, the height of the rubber block 43 is such that when cup-shaped blank 21 is in place as shown in FIG. 6a, the upper portion 43a of rubber block 43 extends slightly above the end portion 21c of cup-shaped blank 21 and contacts the axial end surface of upper die 42 for purposes described hereinafter.

As shown in FIG. 6b, when upper die 42 is moved downwardly, the axial end surface of die 42 pushes against rubber block 43. Rubber block 43 is pressed by movement of upper die 42 so it will be engaged at all points against the inner surface of the blank 21. The continued downward movement of upper die 42 causes rubber block 43 to bulge and apply an outward transaxial force to the cylindrical wall 21a of blank 21 and thus force wall 21a outwardly and into the recess 41b of bottom die 41, and thus shaping blank 21 as shown in FIG. 5c.

Figure 7A:
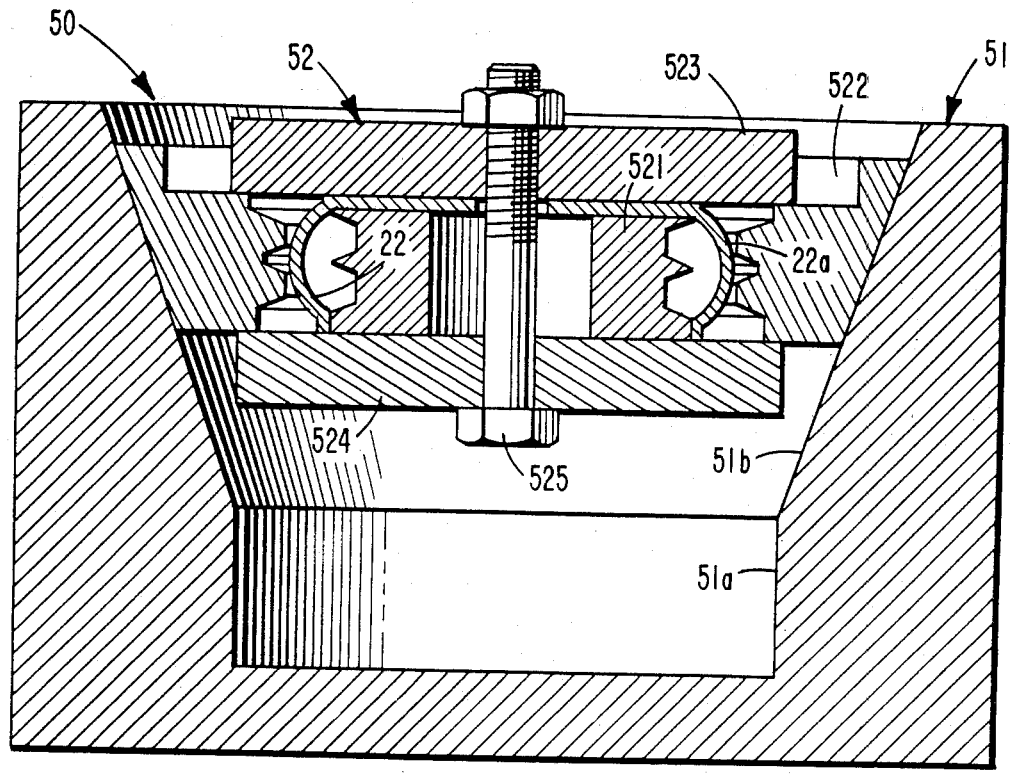
FIGS. 7a and 7b are diagrammatic sectional views through a press dies used to squeeze the stage blank of FIG. 5c to form the squeezed blank of FIG. 5d.
Figure 7B:
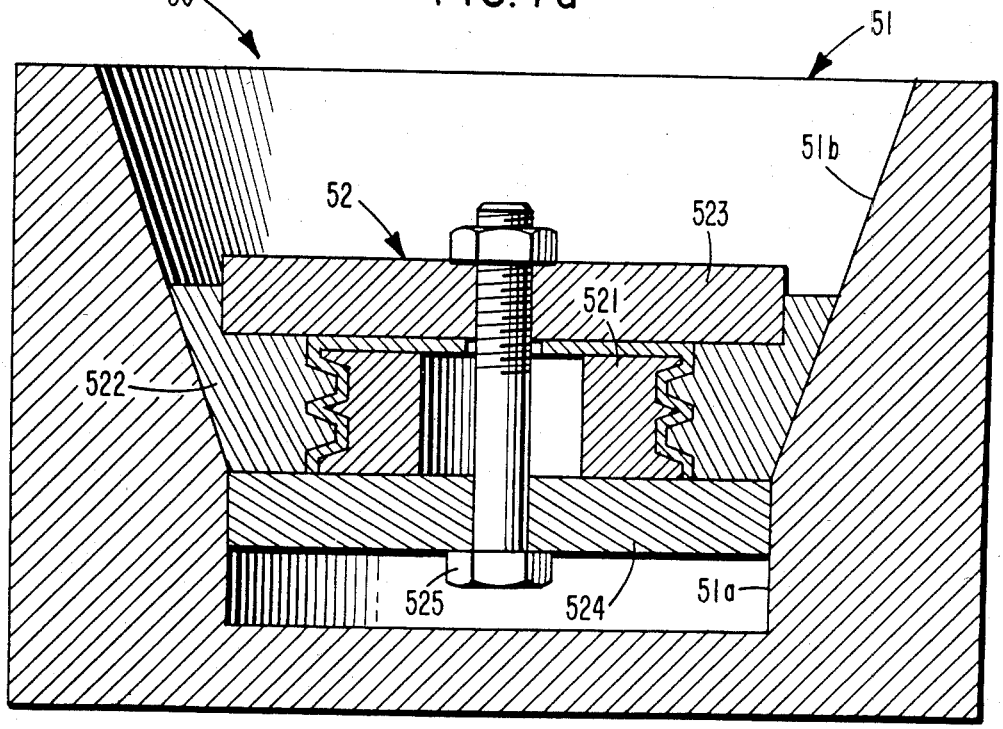

Referring to FIGS. 7a and 7b, the press equipment which may be used to form groove stage blank 23 of FIG. 5d from second stage blank 22 of FIG. 5c and the pressing operation will now be described. Press equipment 50 used to form rough V-shaped grooves at bulge portion 22a of second stage blank 22 includes a bottom die 51 and an upper device 52 which is slidably fitted to bottom die 51. Bottom die 51 has an annular opening 51a. The upper portion of opening 51a has a tapered or conical shaped surface 51b.

Upper device 52 comprises an inner sectional die 521, an outer sectional die 522, and upper and lower spacers 523 and 524. Inner die 521 is located within a gap between both spacers 423, 524. An outer surface of inner sectional die 521 corresponds with the inner surface of an approximately V-shaped groove. An inner surface of outer sectional die 522 corresponds with the outer surface of an approximately V-shaped groove and faces the outer surface of inner die 521. An outer surface of outer die 522 is slidably fitted with the conical surface 51b of bottom die 51. Spacers 523 and 524 are connected by a fastening means, such as bolt 525.

In this arrangement, second stage blank 22 is fixedly disposed within the gap between upper and lower spacers 523, 524. The upper device 52, which contains the second stage blank 22, is located within annular opening 51a and moves downwardly. During movement of upper device 52, since the outer surface of outer sectional die 522 slides on the conical surface 51b of bottom die 51, outer die 522 is moved radially inward until the inner surface of outer die 522 contacts and presses against bulge portion 22a of second stage blank 22 to form the approximately V-shaped grooves.

Figure 8:
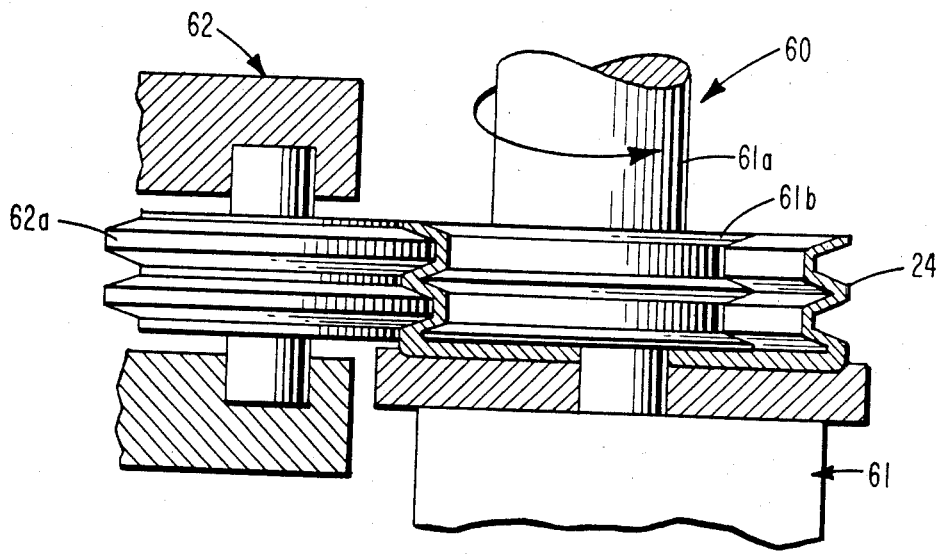
FIG. 8 is a diagrammatic sectional view illustrating spin die forms used to complete spinning and cold working of the squeezed blank of FIG. 5d to produce the rotor of FIG. 5e.

After forming groove blank 23, a roller working operation is applied to blank 23 by roller spinning equipment 60 of FIG. 8 to form preformed rotor 24 with the final configuration of a V-shaped groove. Roller spinning equipment 60 comprises moving die 61 and pressing die 62. Moving die 61 includes a crank shaft 61a rotatably supported on a base of die 61 and a first roller member 61b which is fitted on crank shaft 61a to rotate with it. An outer surface of roller member 61b corresponds with the inner surface of the final configuration of the V-shaped groove. Pressing die 62 includes a second roller member 62a rotatably supported on the base of die 62. The outer surface of second roller member 62a corresponds with the outer surface of the final configuration of the V-shaped groove. Therefore, the gap between first and second roller members 61b and 62a defines the final shape of the V-shaped groove.

In this arrangement, groove blank 23 is attached on moving die 61 and is rotated by crank shaft 61a. Then, pressing die 62 is radially moved toward first roller member 61b to contact and press against the exterior surface of blank 23. Second roller member 62a is rotated together with first roller member 61b to form the V-shaped groove by cold forging.

Figure 9:
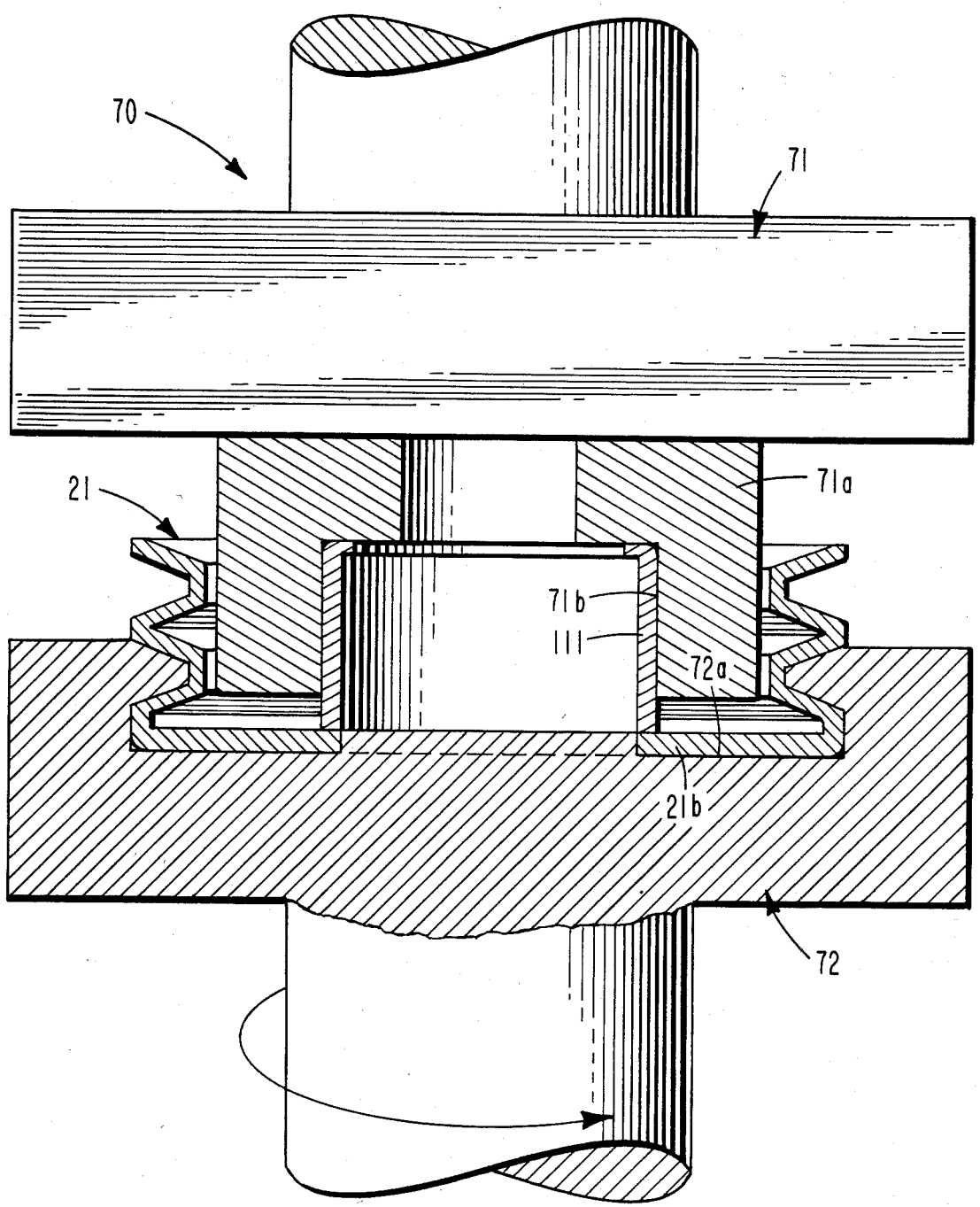
FIG. 9 is a diagrammatic sectional view illustrating friction welding apparatus to produce the rotor of FIG. 5f in its final accurate dimensions.

In the final step or operation of this method, an inner cylindrical member is welded to the bottom end plate of the blank by friction welding equipment 70 of FIG. 9. Equipment 70 comprises upper holder die 71 and bottom holder die 72. Upper holder die 71 has a projection 71a in which a cylindrical depression 71b is formedfor receiving inner cylindrical member 111. Bottom holder die 72 has a receiving depression 72a in which bottom end plate 21b of the blank 21 is disposed.

In this arrangement, the blank with the final V-shaped groove is disposed in bottom die 72 and cylindrical member 111 is disposed in cylindrical depression 71b of upper die 71. Then, cylindrical member 111 is placed in contact with, and pressed against, the bottom end plate portion along the inner radial area; and bottom die 72 is rotated. During the rotation of bottom die 72, the end surface of cylindrical member 111 and the bottom end plate portion are in contact, which causes frictional heating and the formation of a friction welded bond between the cylindrical member and the bottom end plate.

Alternatively, the inner cylindrical member could be welded to the bottom end plate of the blank by other welding methods, such as beam welding.

As mentioned above, the clutch rotor is comprised of an outer cylindrical portion and an axial end plate portion formed integrally with one another, and an inner cylindrical portion welded on the end plate portion, whereby reliability of dimensional accuracy and strength of the clutch rotor is improved, and balance of the clutch rotor is easily attained. Furthermore, a simple pipe member can be used as the inner cylindrical member of the clutch rotor, whereby the cost of the rotor can be reduced, and the rotor easily manufactured.

This invention has been described in detail in the connection with the preferred embodiment, but this is an example only and the invention is not restricted thereto. It will be easily understood by those skilled in the art that other variations and modifications can be easily made within the scope of this invention, which is defined only by the following claims.

I claim:

1. A method of making a clutch rotor for use in an electromagnetic clutch consisting of the steps of:
   (a) forming a cup-shaped blank with a straight, generally cylindrical flange wall and bottom plate having an aperture sized to accommodate a drive shaft so that the clutch rotor is rotatably supported on the drive shaft by pressing a piece of sheet metal into said cup-shaped blank and punching out said aperture;
   (b) forming an annular outward bulge portion in said flange wall by a pressing operation;
   (c) pressing said bulge portion into at least one approximately V-shaped inwardly projecting groove wherein the walls of said V-shaped groove each comprise a single layer of sheet metal;
   (d) forming a final V-shaped groove adapted to receive a drive belt by applying a roller working operation to said approximately V-shaped groove; and
   (e) welding an inner cylindrical member to a radial inner surface of said bottom plate of cup-shaped blank.

2. The method of claim 1 wherein step (b) includes the steps of pressing an elastic member disposed within said cup-shaped blank, and expanding outwardly said elastic member so that said elastic member applies an outward transaxial force to said flange wall.

3. The method of claim 2 further including the step of holding the blank in a die having an annular arc-shaped recess which serves as a mold for the annular outward bulge portion.

4. The method of claim 1 wherein step (c) includes the steps of holding the blank in a first die having the configuration of an approximately V-shaped groove and pressing a second die against the first die to form the approximately V-shaped groove.

5. The method of claim 1 wherein step (e) includes friction welding the inner cylindrical member to the bottom plate by holding the blank in a first die, holding the inner cylindrical member in a second die, placing the inner cylindrical member in contact with the bottom plate and rotating one of the first and second dies with respect to the other.

6. The method of claim 1 wherein step (c) incudes simultaneously pressing said bulge portion into a plurality of approximately V-shaped inwardly projecting grooves and wherein step (d) includes simultaneously forming said plurality of approximately V-shaped grooves into final V-shaped grooves by simultaneously applying a roller working operation to said approximately V-shaped grooves.

7. A method of making a clutch rotor for use in an electromagnetic clutch consisting of the steps of:
   (a) forming a cup-shaped blank with a straight, generally cylindrical flange wall and bottom plate having an aperture sized to accommodate a drive shaft so that the clutch rotor is rotatably supported on the drive shaft by pressing a piece of sheet metal into said cup-shaped blank and punching out said aperture;
   (b) forming an annular outward bulge portion in said flange wall by pressing an elastic member disposed within said cup-shaped blank, and expanding outwardly said elastic member so that said elastic member applies an outward transaxial force to said flange wall and presses said flange wall into said arc-shaped recess;
   (c) holding the blank in a first die having the configuration of an approximately V-shaped groove pressing a second die against the first die to form said outward bulge into at least one inwardly projecting, approximately V-shaped groove wherein the walls of said V-shaped groove each comprise a single layer of sheet metal;
   (d) forming a final V-shaped groove adapted to receive a drive belt by applying a roller working operation to said approximately V-shaped groove; and
   (e) welding an inner cylindrical member to a radial inner surface of said bottom plate of cup-shaped blank by holding the blank in a first die, holding the inner cylindrical member in a second die, placing the inner cylindrical member in contact with the bottom plate and rotating one of the first and second dies with respect to the other.

8. The method of claim 7 wherein the step of forming said at least one approximately V-shaped groove includes simultaneously forming a plurality of approximately V-shaped grooves, and wherein the step of forming a final V-shaped groove includes simultaneously forming a plurality of final V-shaped grooves by a roller working operation.

* * * * *